United States Patent [19]

Campeau

[11] 4,392,643
[45] Jul. 12, 1983

[54] MAGNETIC HOLD DOWN TOOL

[75] Inventor: Gary P. Campeau, Southfield Township, Oakland County, Mich.

[73] Assignee: Suburban Tool, Inc., Birmingham, Mich.

[21] Appl. No.: 134,541

[22] Filed: Mar. 27, 1980

[51] Int. Cl.³ .............................................. B23Q 3/02
[52] U.S. Cl. ..................................... 269/136; 269/276
[58] Field of Search ............................... 269/134–136, 269/276, 282, 283

[56] References Cited

U.S. PATENT DOCUMENTS

| 2,304,317 | 12/1942 | Painter | 269/136 |
| 2,381,815 | 8/1945 | Filburn | 269/136 |
| 2,740,310 | 4/1956 | Larsen | 269/136 |
| 3,565,417 | 2/1971 | Degle | 269/283 |
| 3,711,929 | 1/1973 | Blakey et al. | 269/276 |

FOREIGN PATENT DOCUMENTS

| 283847 | 10/1952 | Switzerland | 269/276 |
| 1313223 | 4/1973 | United Kingdom | 269/276 |

*Primary Examiner*—Robert C. Watson
*Attorney, Agent, or Firm*—Robert G. Mentag

[57] ABSTRACT

A hold down tool comprising an elongated body having a front surface engageable with a workpiece and a rear surface provided with embedded magnet means for retaining the hold down tool on the clamping face of a vise jaw. The rear face in which the magnet means is embedded is formed on a plane that is non-parallel with the front surface of the hold down tool so that the hold down tool provides a "pinching down" force on a workpiece engaged by the front surface of the hold down tool. The hold down tool is self-sustained.

5 Claims, 9 Drawing Figures

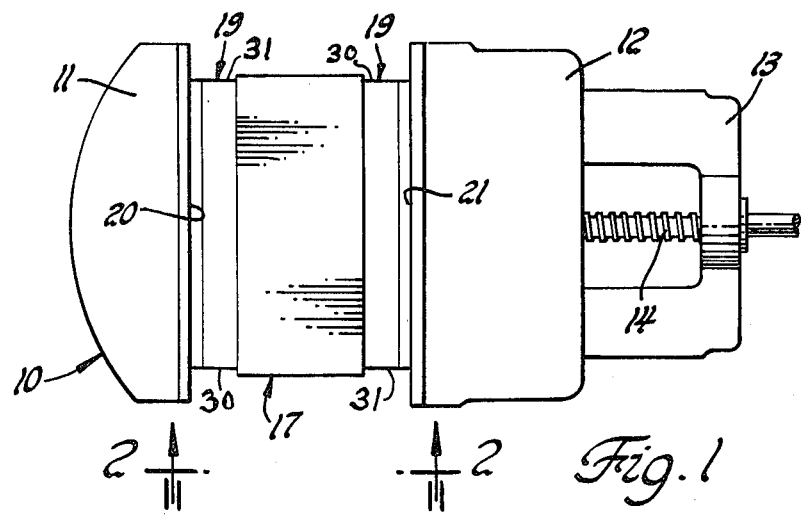
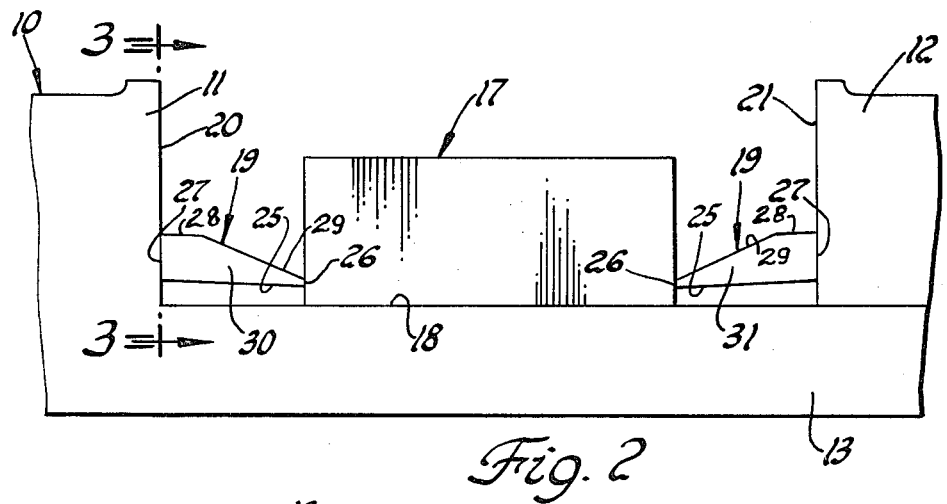
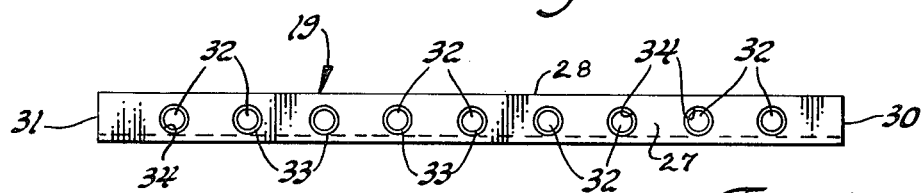
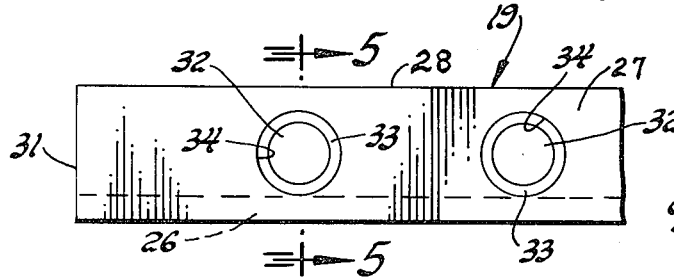

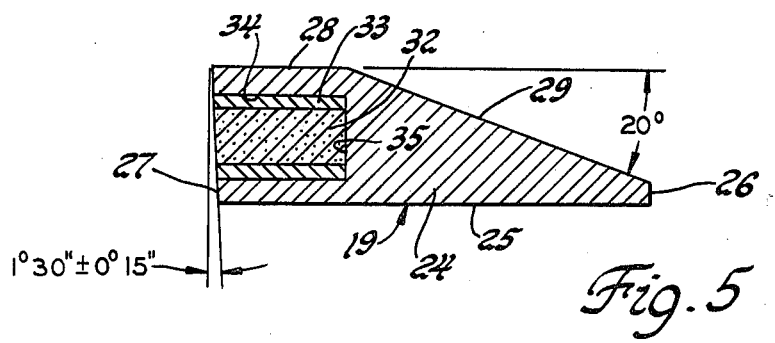
Fig. 5
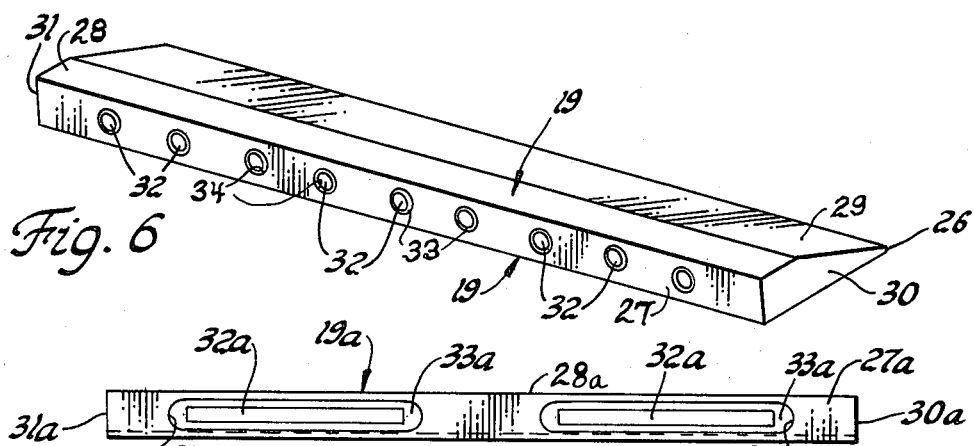
Fig. 6
Fig. 7
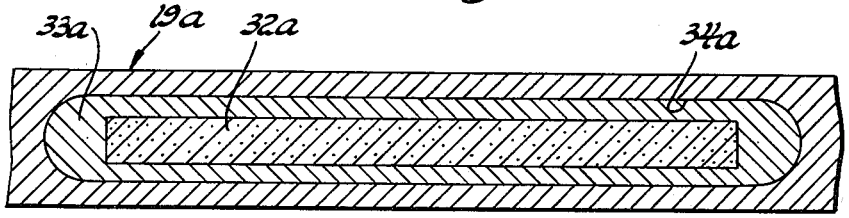
Fig. 9
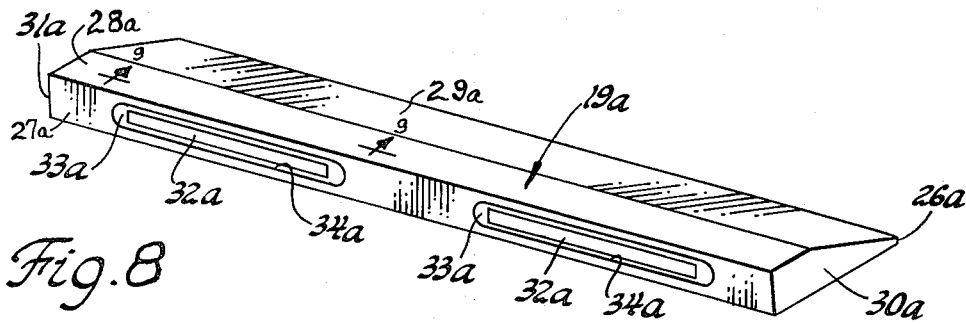
Fig. 8

MAGNETIC HOLD DOWN TOOL

TECHNICAL FIELD

This invention relates generally to the metal working art, and more particularly, to an improved hold down tool for use with vises and clamping means that hold a workpiece for a metal cutting operation thereon. The hold down tool of the present invention is provided with a magnetic means which allows the hold down tool to be self supporting on the stationary and movable jaws of a vise without the need to attach additional structures thereon.

BACKGROUND ART

It is known in the metal working art to provide hold down tools between the faces of a pair of vise jaws for engagement with a workpiece by providing a "pinching down" action on the workpiece to ensure that the workpiece is held tightly on the parallels or work supporting surface of the vise. Examples of such prior art hold down tools are shown in U.S. Pat. Nos. 1,125,207; 1,242,182; 1,951,869; 2,014,967; 2,124,200; 2,477,297; 2,740,310 and 3,020,041.

The prior art hold down tools disclosed in the aforementioned patents operate most efficiently when used in pairs, and a disadvantage of these prior art hold down tools is that they are awkward and difficult tools to use because the operator must use two hands to align and position a pair of such prior art hold down tools, and call for assistance from another party to tighten the vise or other clamping means with which the hold down tools are used.

Some of the prior art hold down tools employ additional supports, and an example is the hold down tool shown in the aforementioned Larsen U.S. Pat. No. 2,740,310. The pair of hold down tools shown in the Larsen patent are restrictive and awkward in use because of the space required for the separately attached magnets for each of the pair of hold down tools.

DISCLOSURE OF THE INVENTION

In accordance with the present invention, a hold down tool is provided which can be used in pairs to quickly and easily position a workpiece in a firmly clamped down position between the stationary and movable jaws of a vise. The hold down tool comprises an elongated body having a front surface engageable with a workpiece and a rear surface provided with embedded magnet means for retaining the hold down tool on the clamping face of a vise jaw without the need to attach additional structures to the hold down tool for holding it in place while the movable vise jaw is moved into a workpiece clamping relationship. The rear face in which the magnet means is embedded is formed on a plane that is non-parallel with the front surface of the hold down tool so that the hold down tool provides a "pinching down" force on the workpiece engaged by the front surface of the hold down tool. The hold down tool of the present invention is self-sustained or supported, and it may be used on practically any thickness of metal, near the bottom of a machine base or platten. The hold down tool of the present invention permits the mounting of a workpiece in a vise or other clamping means in a faster and more efficient manner than heretofore possible with the prior art hold down tools.

BRIEF DESCRIPTION OF THE DRAWINGS

FIG. 1 is a top plan view of a vise provided with a pair of hold down tools made in accordance with the principles of the invention, and showing a workpiece held in the vise between the hold down tools.

FIG. 2 is a fragmentary, enlarged, front elevation view of the structure illustrated in FIG. 1, taken along the line 2—2 thereof, and looking in the direction of the arrows.

FIG. 3 is a rear elevation view of one of the hold down tools illustrated in FIG. 2, taken along the line 3—3 thereof, and looking in the direction of the arrows.

FIG. 4 is a fragmentary, enlarged, rear elevation view of a hold down tool of the present invention.

FIG. 5 is a vertical view of the hold down tool illustrated in FIG. 4, taken along the line 5—5 thereof, and looking in the direction of the arrows.

FIG. 6 is a rear elevational perspective view of the hold down tool illustrated in FIGS. 1 through 5.

FIG. 7 is a rear elevation view of a second embodiment of a hold down tool made in accordance with the principles of the invention.

FIG. 8 is a rear elevational perspective view of the hold down tool illustrated in FIG. 7.

FIG. 9 is a fragmentary, elevation section view of the hold down tool illustrated in FIG. 8, taken along the line 9—9 thereof, and looking in the direction of the arrows.

BEST MODE OF CARRYING OUT THE INVENTION

Referring now to the drawings, and in particular to FIGS. 1 and 2, the numeral 10 generally designates a conventional vise provided with a stationary jaw 11 and a movable jaw 12. The movable jaw 12 is movably mounted on a vise base 13, and it is movable by a conventional screw shaft 14. The numeral 17 generally designates a workpiece that is seated on the vise work support surface 18 between the vise jaws 11 and 12. The numerals 19 generally designate a pair of hold down tools made in accordance with the principles of the present invention, and they are disposed between the vise jaws 11 and 12 on the opposite sides of the workpiece 17. The structure of each of the hold down tools 19 is identical, and the detailed structure of one of these hold down tools 19 is shown in FIGS. 2 through 6.

As shown in FIGS. 1 and 6, the hold down tool 19 has an elongated body which is rectangular in plan view. As shown in FIG. 5, the hold down tool 19 includes a body 24 which has a flat smooth bottom surface 25. As shown in FIG. 5, the hold down tool 19 includes a vertical, smooth elongated front face 26 which is perpendicular to the bottom surface 25, and which is non-parallel to the rear elongated surface 27 of the hold down tool 19. The rear surface 27 is non-parallel to the front surface 26 by a small acute angle, as for example, an angle of 1°30"±0°15", as shown in FIG. 5. The upper surface of the hold down tool 19 comprises two portions which include a rear flat smooth surface portion 28 that is parallel to the bottom surface 25, and a front sloping portion 29 which tapers downwardly and forwardly from the front edge of the rear flat smooth surface portion 28 to the vertical front face 26, at an angle of approximately 20° downwardly from the rear flat smooth surface portion 28.

As shown in FIGS. 3 and 6, the end faces of the hold down tool 19 are indicated by the numerals 30 and 31, and they are flat, smooth and parallel with each other. As shown in FIGS. 3, 4 and 5, the hold down tool 19 includes a plurality of cylindrically shaped permanent magnets 32. Each of the magnets 32 is fixedly mounted in a cylindrical carrier sleeve 33 which is made from a suitable insulating material, as for example, a brass cylinder. Each of the brass cylinders 33, with its magnet 32, is fixedly mounted in place in a bore 34 which is formed to extend inwardly from the rear face 27 of the hold down tool 19. As shown in FIG. 3, the magnets 32 are evenly spaced apart from each other along the rear face 27 of the hold down tool 19, and they are permanent magnets.

In use, with the movable vise jaw 12 moved apart from the stationary vise jaw 11, one of the hold down tools 19 is positioned with is rear face 27 attached by the magnets 32 to the jaw clamping face 20 of the stationary vise jaw 11, and a second hold down tool 19 is positioned with its rear face 27 attached by the magnets 32 to the clamping face 21 of the movable vise jaw 12. The hold down tools 19 are each disposed in a position spaced above the vise work support surface 18, as shown in FIG. 2. A workpiece 17 is then positioned on the work support surface 18, against the front face 26 of the hold down tool 19 on the vise stationary jaw 11, and the movable vise jaw 12 is moved toward the stationary jaw 11 to engage the front face 26 of the hold down tool 19 on the movable vise jaw 12 with the workpiece 17. The vise screw shaft 14 is tightened to securely clamp the workpiece 17 between the hold down tools 19 which provide a "pinching down" action on the workpiece 17 to securely hold it in place on the work support surface 18. The downward clamping force exerted on the workpiece 17 by the hold down tools 19 prevents any upward movement of the workpiece 17 during a metal working operation thereon. The downward clamping force provided by the hold down tools 19 is due to the action of the vise jaws 11 and 12 providing a clamping pressure on the angled back rear surfaces 27 of the hold down tools 19.

It will be seen that the hold down tools 19 of the present invention can be used in pairs, without the need of an extra person to use the same, since one person can easily do the entire job of mounting a pair of hold down tools 19 and a workpiece 17 in a vise, as shown in FIGS. 1 and 2, with only one hand. The hold down tools 19 eliminate awkward fumbling during the setting-up of workpieces 17 and the like, in a vise or other clamping means. The magnets 32, which are mounted in the angular rear contact face 27, support the hold down tools 19 for easy positioning on a vise clamping face, or the like, prior to a clamping action.

The hold down tools 19 may be made of any suitable material, as for example, from a hardened and ground tool steel. The hold down tools 19 may be made to any desired size. The magnets 32 may be secured in their respective carrier sleeve 33 by any suitable adhesive. The carrier sleeves 33 may also be secured in their bores or recesses 34 by any suitable adhesive. It will be seen that the hold down tools 19 allow the same to be self-supported without the need to attach additional supporting structures. The hold down tools 19 may be used on any thickness of metal nearer the bottom of a vise clamping jar, machine base or platen, than heretofore possible with the prior art hold down tools.

FIGS. 7, 8 and 9 disclose a second embodiment 19a of a hold down tool made in accordance with the principles of the present invention. The parts of the second embodiment which correspond to the parts of the first embodiment of FIGS. 1 through 6 have been marked with the same reference numerals, followed by the small letter "a". The second embodiment of FIGS. 7 through 9 employs a plurality of elongated magnets 32a, which have a rectangular outer face that is aligned with the rear surface 27a of the hold down tool 19a. The hold down tool 19a is illustrated as being provided with two elongated magnets 32a. The magnets 32a are each fixedly mounted in a sleeve formed from a molded, non-magnetic, insulating material 33a which surrounds each of the magnets 32a. The carrier sleeves 33a are each mounted in an elongated recess 34a that extends inwardly from the rear face 27a of the hold down tool 19a. The ends of the recesses 34a are rounded. It will be understood that any suitable adhesive material may be employed for retaining the magnets 32a in the non-magnetic insulating carrier sleeves 33a, if said sleeves are formed separately. It will also be understood that the insulating carrier sleeves 33a may also be retained in their respective recesses 34a by any suitable adhesive material. The rear face 27a of hold down tool 19a is also angled in the same manner as the rear face 27 of the first embodiment of FIGS. 1 through 6. The hold down tool 19a of the second embodiment of FIGS. 7 through 9 is used in the same manner as described hereinabove in the description of the use of the first hold down tool 19.

INDUSTRIAL APPLICABILITY

The hold down tool of the present invention is adapted for use with vises and work clamping means for use in connection with machine tools, such as planing machines, milling machines, or other machines of a type wherein it is desirable to hold or secure a workpiece in a predetermined position while it is being operated on.

I claim:

1. The combination with a vise having a pair of jaws, of a pair of workpiece hold down tools, characterized in that:
    (a) each of said hold down tools includes an elongated body having a front end surface for engagement with a workpiece, a flat bottom surface perpendicular to the front end surface, and a rear end surface for mounting against the clamping face of a vise jaw;
    (b) the rear end surface of each body is formed on a plane that is non-parallel with the body front end surface by an inwardly directed acute angle; and,
    (c) magnet means is fixedly mounted on the rear end surface of each body for releasably retaining each hold down tool on the clamping face of one of the pair of vise jaws in a self retaining manner at a selective level relative to a workpiece to be held between the pair of vise jaws, whereby when the vise jaws are moved to a position to clamp said workpiece the front ends of the hold down tools engage said workpiece with a line contact and exert a downward holding pressure on said workpiece.

2. The combination with a vise having a pair of jaws, of a pair of workpiece hold down tools as defined in claim 1, wherein:
    (a) each of said magnet means comprises a plurality of longitudinally spaced apart permanent magnets.

3. The combination with a vise having a pair of jaws, of a pair of workpiece hold down tools as defined in claim 2, wherein:

(a) each of said permanent magnets is carried in a carrier sleeve made from an insulating material.

4. The combination with a vise having a pair of jaws, of a pair of workpiece hold down tools as defined in claim 2, wherein:

(a) each of said permanent magnets is cylindrically shaped.

5. The combination with a vise having a pair of jaws, of a pair of workpiece hold down tools as defined in claim 2, wherein:

(a) each of said permanent magnets is rectangular in plan and cross section shape.

* * * * *